May 1, 1956 C. S. ALLYN, JR 2,743,988

DUPLICATING APPARATUS FOR MAKING MAGNETIC RECORDS

Filed March 18, 1950

INVENTOR
CHARLES S. ALLYN JR.

BY Carl Beust
Louis A. Kline

HIS ATTORNEYS

United States Patent Office 2,743,988

Patented May 1, 1956

2,743,988

DUPLICATING APPARATUS FOR MAKING MAGNETIC RECORDS

Charles S. Allyn, Jr., Dayton, Ohio, assignor to The National Cash Register Company, Dayton, Ohio, a corporation of Maryland Application March 18, 1950, Serial No. 150,457

13 Claims. (Cl. 346—74)

This invention relates to an apparatus for recording data magnetically on record material and in particular to a type of recording apparatus which is adapted to record the same data over and over to produce duplicate records.

When utilizing record media in the form of cards or tape to store data to be used at a subsequent time, it is often nececessary to have the same data appear on a plurality of the records. For instance, in accounting operations, it frequently is necessary to have an assigned number or code recorded on all records related to a single account or transaction, so that various other data on the records may be identified with that account or transaction.

The instant invention provides a simple, efficient apparatus for recording this fixed data magnetically on record material, which carries magnetizable substance capable of being magnetized to produce discrete marks, by utilizing permanent magnets as recording magnets, the magnets being arranged in a desired pattern to engage the record material and locally magnetize the magnetizable substance carried thereby at points of contact to produce distinctively magnetized areas or marks thereon. The recording magnets are so located relative to the record material in a recording operation that the location of the marks on the record material corresponds to the data to be recorded. Once the recording magnets are arranged to engage the record material in the desired pattern, any desired number of markings can be made therefrom merely by feeding record material in proper position and then engaging it with the magnets.

The recording magnets are preferably in the form of elongate magnets, one end of each magnet being capable of engaging the record material. In the preferred form of the invention, each recording magnet is slotted at its record-material-engaging end to form two record-engaging extensions, which are so magnetized that the extension on one side of the slot is a north pole and the extension on the other side is a south pole. When such a magnet takes part in a recording operation, it will cause a discrete pair of magnetized areas or marks to be made where the two extensions engage the record material, the marks of a pair having opposite polarities.

While not the preferred form, it is also possible to eliminate the slot in the record-material-engaging end of the magnet and magnetize the magnet so that the record-material-engaging end of the magnet has one polarity and the remote end has the opposite polarity. When this type of recording magnet engages the record material, it will produce a localized magnetized area or mark of but a single polarity and substantially the outline of the record-material-engaging end of the magnet.

The use of the permanent magnets as recording members enables a much simpler recording apparatus to be provided because it eliminates energizing coils for the magnets and their control circuits and enables a more compact arrangement of recording magnets to be obtained.

It is an object of the invention, therefore, to provide a simple, efficient recording apparatus for making duplicate records magnetically on record material.

A further object of the invention is to provide permanent magnets in predetermined locations relative to the record material, so that, by feeding record material opposite the magnets and engaging it with the magnets, the recording of the same data on various ones of the records readily can be obtained.

A further object of the invention is to produce a recording element having a plurality of permanent magnets which are located thereon according to a pattern representing data to be recorded.

A further object of the invention is to provide a recording element on which a plurality of permanent magnets having bi-polar recording surfaces can readily be placed in any desired ones of predetermined positions with desired polar orientation to produce any desired data-representing pattern.

With these and incidental objects in view, the invention includes certain novel features of construction and combinations of parts, a preferred form or embodiment of which is hereinafter described with reference to the drawing which accompanies and forms a part of this specification.

Figures 1, 2, 3, 4, 5:
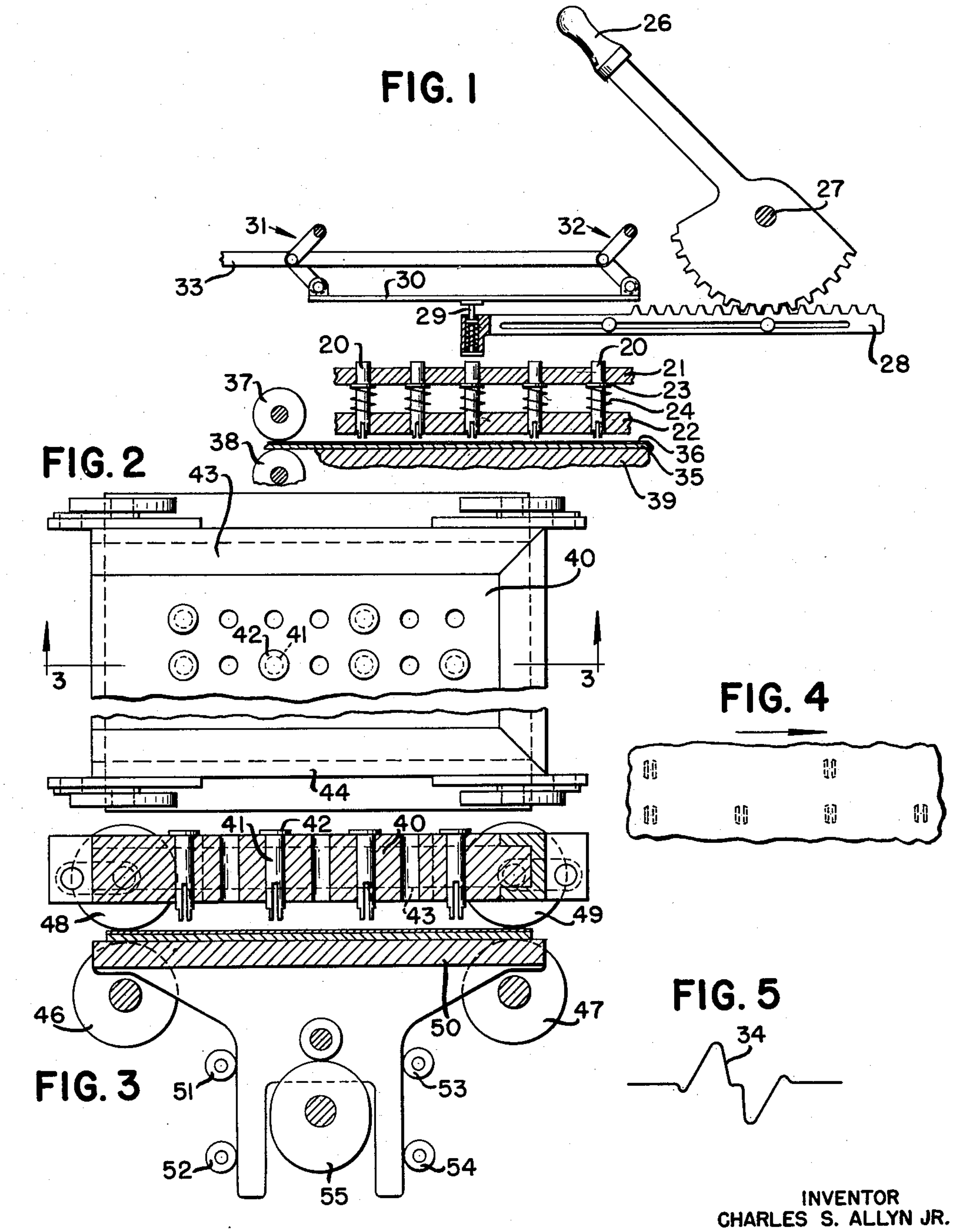
Fig. 1 shows a portion of a form of duplicating apparatus in which the permanent magnet recording magnets can be selected manually.
Fig. 2 is a top plan view showing a portion of a form of duplicating apparatus in which the permanent magnet recording magnets are mounted in a plate according to a predetermined pattern.
Fig. 3 is a section taken along the line 3—3 of Fig. 2, showing the recording magnets in the plate and the means for bringing about the engagement of the magnets and the record material.
Fig. 4 is a portion of the record material on which magnetized areas or marks have been made by the recording magnet arrangement of Fig. 2.
Fig. 5 is a diagram showing a typical signal which could be obtained by passing one of the marks on the record material of Fig. 4 past a magnetic pick-up head.

One form of duplicating apparatus is shown in Fig. 1. In this form, a row of recording magnets 20 is provided for each column of data to be duplicated, a portion of one row being shown in this figure.

Each of the recording magnets, by its position in the row, is capable of representing a predetermined amount or symbol, and, by selecting the recording magnet of the row corresponding to a particular amount or symbol, a representation of that amount or symbol may be recorded on the record material.

The selection of the recording magnets may be effected by any desirable means, one such means being shown in Fig. 1, in which a lever 26, pivoted on a shaft 27, is operable to shift a selecting slide 28 to move a plunger 29 to a position above the selected recording magnet.

The selected recording magnet can be depressed in a recording operation by the downward movement of a plate 30, which extends over the recording magnets and which can force the plunger 29 downwardly to impart a corresponding movement to the selected recording magnet. The plate 30 is guided for vertical movement by any suitable means and is supported on toggle links 31 and 32, which will force the plate downwardly when the toggle links are straightened by the movement of the pitman 33 to the right as viewed in Fig. 1. Accordingly, duplicate recording operations can be effected merely by operating the pitman to depress the selected recording magnets 20.

The recording magnets 20 are made of high-retentivity permanent magnet material such as the copper-nickeliron alloy sold by General Electric Company, of Pittsfield, Massachusetts, under the trade name "Cunife," and are in the form of elongate bars which are guided for vertical movement in upper and lower guide plates 21 and 22 of non-magnetic material. Each magnet has a flange 23 thereon and is urged upwardly by a spring 24 compressed between the plate 22 and the flange 23, until the flange engages the under side of the upper plate 21. The lower or record-material-engaging end of each magnet is slotted to form two pole pieces, and the magnet is so magnetized that one of the pole pieces will be a north pole and the other will be a south pole. In order that the magnetic marks on the record material will be as sharp as possible, the pole pieces are further cut away, as shown in Fig. 1, to produce as nearly line-like marks as possible. An indication of the shape of the marks which are produced by the recording magnets is shown in dotted outline in Fig. 4.

The magnetized mark which is produced by one of the recording magnets will be effective, when moved past a magnetic pick-up head in the direction of the arrow in Fig. 4, to produce a signal which, as seen on an oscilloscope, will approximate the curve 34 of Fig. 5.

The record material 35 (Fig. 1), which may be in the form of a strip or record card, has a coating 36 of magnetizable material thereon and is fed by suitable feeding means including rollers 37 and 38 into recording position beneath the recording magnets, where it is supported on a plate 39 of non-magnetic material.

The duplicating apparatus of Fig. 1 operates as follows. The levers 26 related to the several columns of data to be duplicated are set according to this data and position the slides 28 with the plungers 29 over the desired recording magnets 20. Record material is fed into recording position on plate 39 by the feeding means, which includes rollers 37 and 38, and, after the record material has come to rest beneath the recording magnets, the pitman 33 is operated to depress the selected recording magnets into engagement with the record material. This duplication of data can be accomplished about as fast as fresh record material can be fed to recording position, because the time required to depress the recording magnets to engage the record material will be very short.

Where the same data is to be used frequently in duplicating runs, the form of apparatus shown in Figs. 2 and 3 may be used. In this form, a plate 40 of non-magnetic material, and having holes in all possible data-representing positons, is provided, and permanent-magnet recording magnets 41 are inserted in the holes in the desired pattern. The recording magnets 41 can be held in place by frictional engagement with the sides of the holes in the plate 40, as shown in Figs. 2 and 3, or they may be locked in position by an overlying plate of non-magnetic material (not shown), which can extend over the heads 42 of the magnets and can be secured to the plate 40. As described earlier, each of the recording magnets 41 is slotted at its lower end to form two pole pieces, which are magnetized to provide a north pole and a south pole, and are shaped to form thin record-material-engaging surfaces. The form of apparatus shown in Figs. 2 and 3 has a particular advantage over the form shown in Fig. 1, in that a greater latitude in combinations and arrangements of marks can be obtained therefrom. This is possible because, in the form of Fig. 1, only one magnet of a row can be selected to take part in a recording operation, whereas in the form of Figs. 2 and 3, one or more magnets can be provided in each row of plate 40 in selected positions therein to make up the desired combinations of marks, and the magnets themselves can be oriented selectively in the rows to reverse the positions of the poles and provide even further variations in the combinations of marks which might be obtained.

A plate 40 with its arrangement of recording magnets 41 could be provided for each set of frequently-duplicated data, and, when it is desired to make duplicate records according to some particular data, that plate having the pattern of magnets thereon corresponding to the desired data can readily be inserted in the apparatus in suitable supporting brackets 43 and 44, to have duplicate records made therefrom.

The brackets 43 and 44, shown in Figs. 2 and 3, are mounted on a stationary part of the apparatus and are adapted to receive the plate 40 inserted therein and hold it with the recording magnets in operative position, so that record material can be moved into engagement with the magnets during duplicating operations.

The coated record material is fed into recording position by any suitable feeding means, one form including driven feeding rollers, as 46 and 47, on opposite sides of the brackets 43 and 44, and related yieldably-mounted pressure rollers, as 48 and 49, which can feed record material into and away from recording position on a supporting member 50 of non-magnetic material.

The supporting member 50 is mounted for vertical movement between guide rollers, as 51, 52, 53, and 54, and is moved upwardly by a cam 55, which is rotated in each recording operation. The rotation of the cam 55 is so timed with the operation of the feeding means that the record material will be fed into recording position and retained in this position while the support 50 is raised to move the record material into engagement with the recording magnets. After the support 50 is restored to its normal position, the feeding means will operate again to feed the record material, upon which the record has been made, from the support and feed fresh record material into recording position on the support.

The engagement of the record material with the magnets will produce localized magnetized areas or marks in a pattern, as shown in Fig. 4, corresponding to the pattern of the arrangement of magnets in the plate 40, as shown in Fig. 2.

The type of duplicating apparatus shown in Figs. 2 and 3 is extremely simple and easy to set up for a duplicating run because the permanent-magnet recording magnets can readily be arranged in the plates 40 in desired patterns, inasmuch as these magnets do not require energizing coils and connections thereto. The plates, as 40, with their arrangements of magnets, form units which can be conveniently handled and inserted in the apparatus to set up the data to be recorded in the duplicating run.

While the brackets 43 and 44 are mounted on a stationary part of the apparatus in the form of the apparatus of Fig. 3, it is clear that these brackets may be part of a reciprocal head similar to the plate 30 of Fig. 1 and can carry the plate 40 and its pattern of recording magnets downwardly to engage the record material in a manner similar to that shown in Fig. 1.

The novel duplication apparatus is made extremely simple by the use of the individual permanent-magnet recording magnets in predetermined positions to represent data, which magnets, because they do not require energizing coils and connections, can be made quite light and can be operated over and over very rapidly in duplicating operations if the movable recording magnet type of apparatus is used.

While the form of the invention shown and described herein is admirably adapted to fulfill the objects primarily stated, it is to be understood that it is not intended to confine the invention to the forms or embodiments disclosed herein, for it is susceptible of embodiment in various other forms all coming within the scope of the invention.

What is claimed is:

1. A recording element for use in a duplicating apparatus which records the same data on magnetizable record members, the recorded data being in the form of a pattern of discrete magnetic marks which, by their relative location in the pattern, represent the data, consisting of a supporting member and a plurality of individual permanent magnets mounted only at predetermined positions thereon which are necessary to produce the particular pattern of magnetic marks having the required relative positions to represent the data to be recorded, said magnets having record-member-engaging portions and being capable of producing the same pattern of magnetic marks on each of the record members merely by contact therewith.

2. An element as claimed in claim 1 in which the supporting member is made of non-magnetic material.

3. An element as claimed in claim 1 in which each magnet has bi-polar record-engaging portions for recording a spaced north and south pole for each mark.

4. An element as claimed in claim 1 in which the supporting member is provided with means to removably receive the magnets in any of a plurality of possible data-representing positions whereby the location of magnets thereon and the data to be recorded thereby can readily be changed.

5. An element as claimed in claim 4 in which the magnets have bi-polar record-engaging portions and the pattern produced by the magnets is made up of their location on the supporting member and the orientation of their poles.

6. An element as claimed in claim 1 in which the magnets have bi-polar record-engaging portions and in which the pattern of the magnets includes the orientation of their poles.

7. A readily-insertable element for use in a duplicating apparatus by which data is recorded on a magnetizable record member in the form of a pattern of discrete magnetic marks, consisting of a plate of non-magnetic material having apertures therein in all possible data-representing positions, and a plurality of permanent magnets inserted in selected ones of said apertures to form the desired pattern corresponding to the data to be duplicated and having record-member-engaging poles to engage the record member and make marks thereon according to said data.

8. An element as claimed in claim 7 in which each of the magnets is bi-polar and records a spaced north and south pole for each mark.

9. In a duplicating apparatus for making duplicate magnetic records of data in the form of any particular pattern of discrete magnetic marks on magnetizable record material, the combination of a removable recording member of non-magnetic material having means to receive magnets in all positions which may be necessary to produce the desired pattern of marks, and including permanent magnets inserted in only those positions forming the desired pattern of marks; means to hold the member in the apparatus and against movement in a recording operation; means to feed record material into recording position opposite the recording means; and means for moving the record material in recording position into engagement with the magnets, said apparatus, by merely moving the record material to engage the magnets, being capable of extremely rapid operation in the making of duplicate records.

10. Apparatus as claimed in claim 9 in which each permanent magnet is formed at its record-engaging portion with pole pieces which are shaped to produce two thin closely adjacent parallel magnetic lines on the record material and which are magnetized to have opposite polarity, whereby to produce marks which will produce maximum signals when sensed.

11. An apparatus as claimed in claim 9 in which the means to receive the magnets consists of an ordered array of apertures in the member located in all possible positions in which may be necessary to produce any of the desired patterns and into which the magnets may be readily inserted or removed to enable the desired patterns to be set up and changed as desired.

12. In a duplicating apparatus for making duplicate magnetic records of data in the form of any particular pattern of discrete magnetic marks on magnetizable record material, the combination of a plurality of permanent-magnet recording magnets; one for each possible position in any possible pattern of marks; means for movably supporting the magnets in rows and columns defining said plurality of positions; means normally urging the magnets away from recording position; manually-operable selecting means cooperating with the rows of magnets for positioning an interponent opposite the magnet in each row which is required to make up the desired pattern to be recorded; means to feed the record material into operative relation with the recording magnets; and operating means operating through the interponents to move the selected magnets into engagement with the record material to record the desired pattern of marks thereon.

13. An apparatus as claimed in claim 12 in which each permanent magnet is formed at its record-engaging portion with pole pieces which are shaped to produce two thin closely adjacent parallel magnetic lines on the record material and which are magnetized to have opposite polarity, whereby to produce marks which will produce maximum signals when sensed.

References Cited in the file of this patent

UNITED STATES PATENTS

| | | |
|---|---|---|
| 720,621 | Rosenbaum | Feb. 17, 1903 |
| 825,303 | Darlington | July 10, 1906 |
| 2,247,905 | Bryce | July 1, 1941 |
| 2,258,106 | Bryce | Oct. 7, 1941 |
| 2,346,582 | Insler et al. | Apr. 11, 1944 |
| 2,359,617 | Bryce | Oct. 3, 1944 |
| 2,436,829 | Roth | Mar. 2, 1948 |
| 2,453,582 | Morgan | Nov. 9, 1948 |
| 2,511,121 | Murphy | June 13, 1950 |
| 2,561,476 | Lang | July 24, 1951 |

OTHER REFERENCES

"G. E. Review," July 1952, pps. 20–22 and 61.